Jan. 30, 1962 M. H. GWYNN 3,019,181
HYDROFINING AND CATALYST REGENERATION PROCESS
Filed Feb. 5, 1959 2 Sheets-Sheet 2

INVENTOR.
MARION H. GWYNN
BY
ATTORNEY

United States Patent Office 3,019,181
Patented Jan. 30, 1962

3,019,181
HYDROFINING AND CATALYST REGENERATION PROCESS
Marion Hayes Gwynn, Meslar Road, Morris Plains, N.J.
Filed Feb. 5, 1959, Ser. No. 791,302
11 Claims. (Cl. 208—217)

This invention relates to improvements in the hydrofining of sulphur containing hydrocarbon fluids, including in particular, light to medium petroleum distillates and similar distillates derived from coal tar, shale, or tar sand, wherein catalytic nickel is employed as the hydrofining and desulphurizing agent. More particularly, the invention relates to a basically new procedure for regenerating active nickel catalyst involving electrolytic separation of free sulphur from spent sulphided catalyst and to modified hydrofining and desulphurizing procedures which provide spent catalyst which is especially susceptible to such electrolytic regeneration, while at the same time substantially enhancing the efficiency and effectiveness of the catalyst in desulphurizing and hydrofining operations.

Extensive efforts have been made over a number of years to develop practical methods for hydrofining hydrocarbon distillates either for the primary removal of sulphur therefrom, or for effecting both removal of sulphur and hydrogenation, or other hydrofining operations. These efforts have included the use of various of the heavy metals and compounds thereof as catalytic agents with nickel and nickel compounds receiving considerable attention. Catalytic nickel may be prepared as sulphur saturated, or as more active sulphur sensitive catalyst; and sulphur sensitive nickel may be prepared in a variety of activities. Most previous attempts to apply sulphur sensitive nickel to hydrofining have resorted to less active preparations, e.g. grey nickel oxide. Such preparations are limited both in activity and in effective catalytic surface, with lack of hydrogenating activity more noticeable than lack of sulphur combining activity. In order to remove the more difficult forms of sulphur without pyrolysis, concurrent hydrogenation is required. Such hydrogen can be added via either of two types or catalyst. One type is exemplified by sulphided cobalt molybdate, or by nickel sulphide with or without tungsten sulphide or oxysulphide. Such sulphur saturated catalysts, like cracking catalysts, depend heavily upon high temperature and pressure for their effect, sulphur being split out of organic combination as hydrogen sulphide. The other type of catalyst and the type employed in the present invention is a much more active type of hydrofining catalyst, providing enhanced sulphur combining activity and the maximum of catalytic active surface. This type of catalyst requires more skillful operation and the more frequent and practical regeneration, but has distinct advantage both from the standpoint of effectiveness of sulphur removal and flexibility and control in related hydrofining operations.

In certain respects the hydrofining operation as carried out in accordance with the present invention corresponds with hydrofining operations as disclosed in my United States Patent No. 2,587,149. The process as disclosed in said patent, however, leads to substantial quantities of by-product sodium sulphate which in many localities, is not an economically practical by-product. Thus, despite the points of similarity between the process of the present application and the process of my prior United States Patent No. 2,587,149, it must be borne in mind that the present process involves numerous modifications facilitating the use and recovery of sulphided or spent catalyst in a form practical for regenerating by my novel procedure.

The concept of electrolytic regeneration of spent nickel catalyst is not broadly new, having been disclosed, for example, in my prior United States Patent No. 2,315,518. The electrolytic regeneration as disclosed in the present application, however, is a quite different, faster, and more efficient electrolysis than that described in said prior application.

Regarded in certain of its broader aspects, my invention comprises preparing highly active nickel catalyst according to the electrolytic regeneration procedure herein disclosed; utilizing such catalyst in a series of differently controlled hydrofining steps, including at least one step in which the catalyst is acting primarily as a sulphur sensitive catalyst combining with sulphur to form more highly sulphided catalyst, and preferably one or two steps in which the catalyst is essentially sulphur saturated, liberating sulphur as hydrogen sulphide and effecting hydrogenolysis upon hydrocarbon components, to yield a spent catalyst which is predominately in the form of $Ni_3S_2$, melting such spent catalyst with adjustment of composition by regulation of the sulphur content to cast therefrom durable anode plates, and subjecting such anode plates, preferably enveloped in porous bags to receive liberated sulphur, and exposing same to electrolysis in electrolyte comprising sodium chloride to thereby directly form a precipitate of nickel hydroxide which with minimum operations of partial drying and shaping, can be reutilized as fresh catalyst in the process.

Between regenerations, the catalytic nickel may be utilized in a plurality of treating or hydroprocessing steps. It may be used initially, for example to sweeten sour distillate by percolation through freshly regenerated catalyst at relatively low temperature and pressure, in which operation the catalyst has no appreciable effect on the hydrocarbons. At slightly higher temperature and pressure, the partially sulphided nickel behaves both as reagent and catalyst, taking up additional sulphur and having a hydrogenating action on olefines in the hydrocarbon distillates being treated. This is the primary step of my hydrofining process, involving temperatures colder than pyrolytic and markedly graded with controls being effected to provide satisfactory progressive sulphiding of the nickel. The temperature gradient is obtained by means of hydrogen or other fluid coolant injected directly into the flowing reactants in a column. Thereafter, the sulphided nickel can be preferably used to catalyze another and hotter hydroprocessing, viz. a hydrofining or hydrocracking. The temperatures at this stage are preferably pyrolytic and carbon may accumulate on the catalyst. The sulphur removed at this stage is liberated as hydrogen sulphide. It is to be noted, however, that this last type of hydrofining is not essential to the overall regeneration and reuse process as herein disclosed, but represents an example of the flexibility of the process, permitting variation in the type of end product recovered from a particular distillate.

While desirably the spent catalyst should be predominately nickel sub-sulphide, $Ni_3S_2$, to facilitate preparation of the nickel sulphide anodes for the electrolytic regeneration, it should be understood that if a less sulphided catalyst is otherwise ready for regeneration, the composition of the melt from which the anodes are cast, can be adjusted by merely recycling some of the sulphur which is liberated in the process. Adjustment of the sulphur content of the melt is important as hereinafter described for producing cast anodes which, after annealing, will have the desired strength and properties to be uniformly corroded during the electrolysis.

Before discussing in detail the hydrofining and regeneration process, it is thought advisable to mention briefly certain of the objects and advantages and special features of the invention.

The essential object of my invention is to provide very active hydrofining surfaces, together with means for efficient or multiple use, including minimizing their unnecessary or premature deactivation during hydrofining, and means for complete and economical regeneration. With such surfaces, hydrofining temperatures and pressures are decreased extraordinarily. Low hydrofining temperatures improve product quality and decrease losses due to methane and ethane formed by hydrogenolysis. The low temperature and pressure reactor may be constructed of unlined carbon steel.

An object of this invention is to produce an improved product. Essentially freed of olefines, a gasoline rumbles less in a high compression and sparkplugged engine. And the exhaust therefrom becomes less smog forming. Distillate may be freed of dissolved hydrogen sulphide and mercaptans. In the presence of hydrogen sulphide, mercaptans slowly form during cobalt molybdate or similar hydrofining. Such hydrofining may recirculate large volumes of hydrogen low in hydrogen sulphide content to lessen residual mercaptan. The equilibrium proportion of mercaptan is higher in aliphatic than in aromatic hydrocarbons, much higher with olefines than paraffins. Mercaptans can synthesize via an olefinic intermediate. A motor fuel distillate free of hydrogen sulphide and mercaptans is "sweet." If also less than about 0.01% sulphur, the response to tetraethyl lead additions is not impaired practically. If essentially free of sulphur and other nonhydrocarbon elements, platinum catalyst may remain elementally unpoisoned during subsequent dehydrogenation and other reforming.

An object of this invention is to recover much or most of the removed sulphur without producing and handling the corrosive and toxic hydrogen sulphide. The elemental electrolysis of nickel subsulphide directly produces a sulphur power at the anode, readily purified by separating minor portions of insoluble nickel compounds.

Another object of this invention is to provide a more continuous hydrofining. Cobalt molybdate and similar catalysts must be regenerated or replaced. The frequency of the resulting change-overs or shutdowns largely depends upon hydrofining severity.

Another object of this invention is to furnish an abundant supply of sulphided nickel catalyst. Then hydrofining with sulphur saturated catalyst can be carried out more cleanly or at lower pressures. Or hydrofining can be more severe, hydrocracking more destructive. Sulphided nickel may be partially desulphided at the anode in a chloride ion anolyte to obtain partially active catalytic surfaces.

Another object of this invention is to provide regeneration for converting heavily sulphided nickel in one chemical operation to nickel hydroxide or similar readily reducible compound.

An essential object of this invention is to control the nickel's sulphiding during hydrofining between successive regenerations. The nickel is sulphided to an extent less than that represented in the formula NiS. I obtain improvement both in hydrocarbon product and in electrolysis when sulphiding the nickel to a subsulphide, e.g. as represented in the formula $Ni_3S_2$. Steps in my invention may be otherwise coacted to improve product or economy. Examples follow. Hydrogen is added to a hot hydrofining mixture both to cool and to increase the proportion of hydrogen in fresher and more hydrogenating catalyst stages. Such a hydrofined vapor-hydrogen mixture can be fed directly without cooling or condensing directly to the preheater and compressor for the first stage of platinum reforming. In another example, spent sulphur sensitive nickel prior to regeneration may be used as sulphur saturated catalyst, particularly for pyrolytic or severe hydrofining. In another example, nickel subsulphide slag is recovered so as to remove detrimental elements such as carbon, iron, lead, arsenic from the nickel. In another example, iron dissolved from hydrofining and regenerating equipment helps to eliminate lead and arsenic transferred from distillate to nickel surfaces.

The novel hydrofining, catalyst regenerating, and related procedures in accordance with the present invention will be readily understood from the following description, together with the accompanying drawing in which various steps and apparatus employed in such procedures are identified by suitable reference characters in each of the views, and in which.

Figure 1:
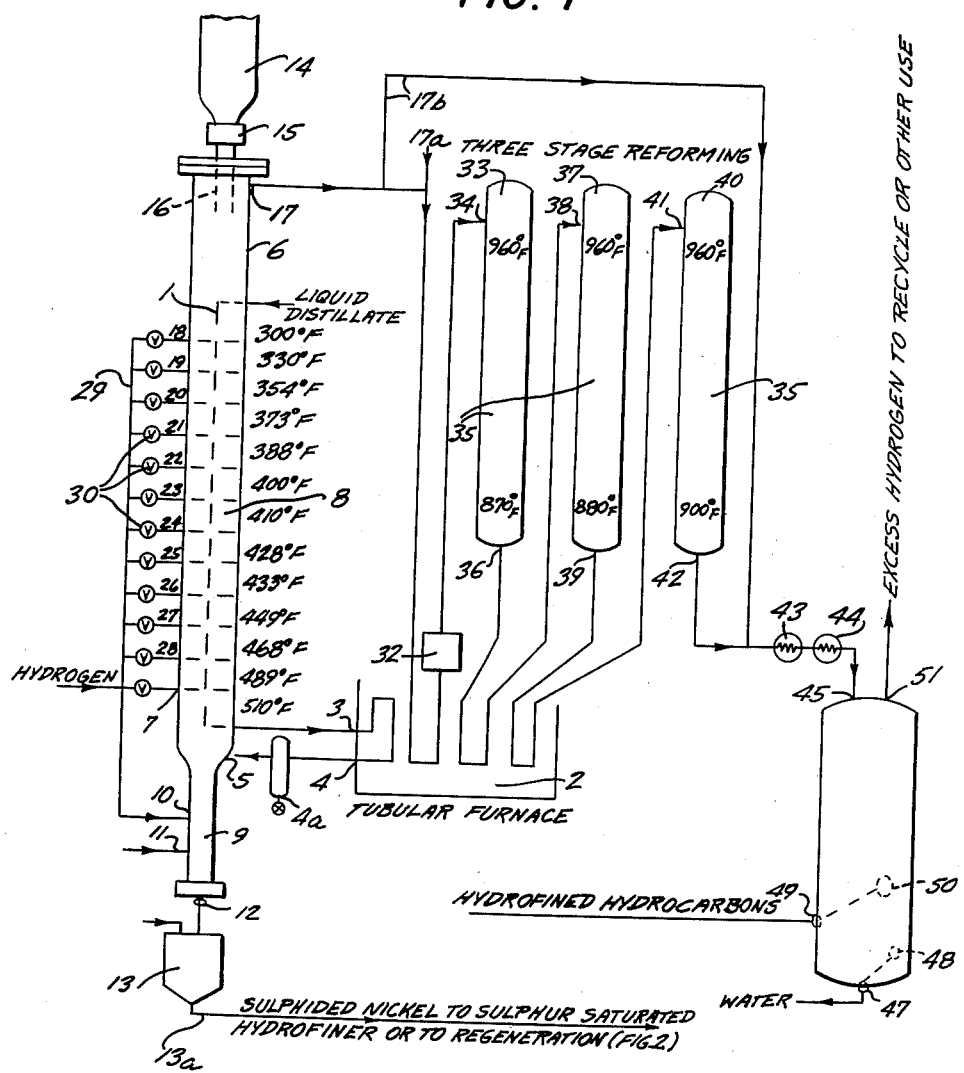
FIG. 1 is a schematic showing of my hydrofining and reforming procedures.

FIG. 1 shows multistage countercurrent hydrofining. The granular nickel bed moves downflow slowly by gravity. Or a finer nickel may move downflow under dense phase fluidized conditions, e.g. down a narrower tower. As an example, a light naphthenic distillate under pressure is pumped down through a tube bundle 1 with hydrofining tower 6 to cool the catalytic granules or powder flowing through. The preheated naphtha enters the tubular furnace 2 at inlet 3. Naphtha vapor leaves the furnace at exit 4. Heavy ends and any tar may be trapped out in separator 4a. The crude vapors enter hydrofining tower 6 at low inlet 5. Hot or cold hydrogen may be introduced near the naphtha vapor at inlet 7. The vapors pass upflow through the nickel bed 8, e.g. at an increasing linear velocity between two feet per minute and two feet per second. The linear velocity in the upper part of bed 8 may be severalfold greater than the velocity through the lower part of bed 8.

Sulphided nickel passes downflow through a hydrocarbon stripping zone 9. Hydrogen enters this zone at inlet 10. Steam enters the stripping zone at inlet 11. Sulphided nickel leaves the stripping zone at exit 12. The exit may comprise a rotating port or lock device.

The sulphided nickel granules from exit 12 are blanketed or protected from air contact in receiver 13. The sulphided granules may be transferred via conveyor 13a to a sulphur saturated hydrofiner (not shown) or to regeneration as in FIG. 2.

Fresh catalytic nickel compound flows from hopper 14 through a lock or a check valve or leg device 15. The nickel compound enters near the top of hydrofining tower 6 at outlet 16. The damp or fresh catalytic nickel granules filter may entrain any fines from the vapor mixture leaving tower 6 at exit 17. Or the top zone of the sulphur sensitive hydrofining tower may be constructed wider than the mid or hydrofining zone. The temperature gradient as shown down hydrofining zone of tower 6 may be obtained almost entirely, but preferably only in part, by introducing relatively cool hydrogen at many points, e.g. inlets 18, 19, 20, 21, 22, 23, 24, 25, 26, 27, 28. Hydrogen enters these inlets from manifold 29 and through each of twelve valves 30. Cooling hydrogen may be further distributed internally by devices not shown. For example, the hydrofining zone comprises a series of baffle distributors shown as horizontal dashes within tower 6. The hydrofined vapor hydrogen mixture leaving exit 17 may pass directly to reforming or bypass via pipe 17b to heat exchangers and separator 46.

The hydrofining hydrocarbon vapor mixed with wet hydrogen is reheated in tubular furnace 2. The vapor mixture then enters compressor 32, boosting the vapors to reforming pressures. The compressor vapors enter the first reforming reactor 33 at inlet 34. Each of the reforming reactors contains supported platinum reforming catalyst 35. The catalyst may comprise 0.2 to 1.5% platinum by weight on cocatalytic alumina. The larger proportions of platinum may be used with longer lived and fewer, e.g. 1 to 3, stages of reforming. An alumina of moderate or high specific surface may be modified with one or two minor components, e.g. in a proportion like that of the platinum. One example of such a minor component is fluorine, another is silica. The alumina may be impregnated with a hot acidic platinum solution. The impregnated alumina is drained, dried, roasted. For the large proportions of platinum, this catalyst may be reimpregnated, drained, dried and heated to decompose the platinum compound to metallic platinum. The vapors downflowing in reactor 33 cool, e.g. 80 or 90° F. during the endothermic dehydrogenation. The partially dehydrogenated vapors leave reactor 33 at outlet 36. These vapors are reheated in tubular furnace 2, then enter the second reforming reactor 37 at inlet 38. The further dehydrogenated vapors leave the reactor at exit 39. These vapors are reheated in tubular furnace 2, then enter the third reforming reactor 40 at inlet 41 and leave at exit 42. Another reforming reactor, not shown, may serve either as a swing or as a fourth stage reactor. Examples of reforming temperatures are shown near the inlet and exit of each reforming reactor. These temperatures may vary somewhat. For example, the inlet temperatures may be colder with fresh platinum catalyst, warmer for more severe reforming.

The reformed mixture passes through heat exchanger 43, is further cooled in cooler 44, thence passes through inlet 45 into separator 46. Therein continuous separation of three phases occurs. Water leaves the bottom at exit valve 47 controlled, for example, by a float 48 at the liquid interface. The reformed hydrocarbons leave separator 46 at exit valve 49 controlled, for example, by a float 50 at the hydrocarbon hydrogen interface. Hydrogen and methane and other gases leave separator 46 at top exit 51. This hydrogen mixture is relatively pure except for a content of light paraffins. The less volatile of these may be scrubbed out while still under pressure. Part of the scrubbed hydrogen may be recycled, the remainder used, for example, in sulphur saturated hydrofining.

Figure 2:
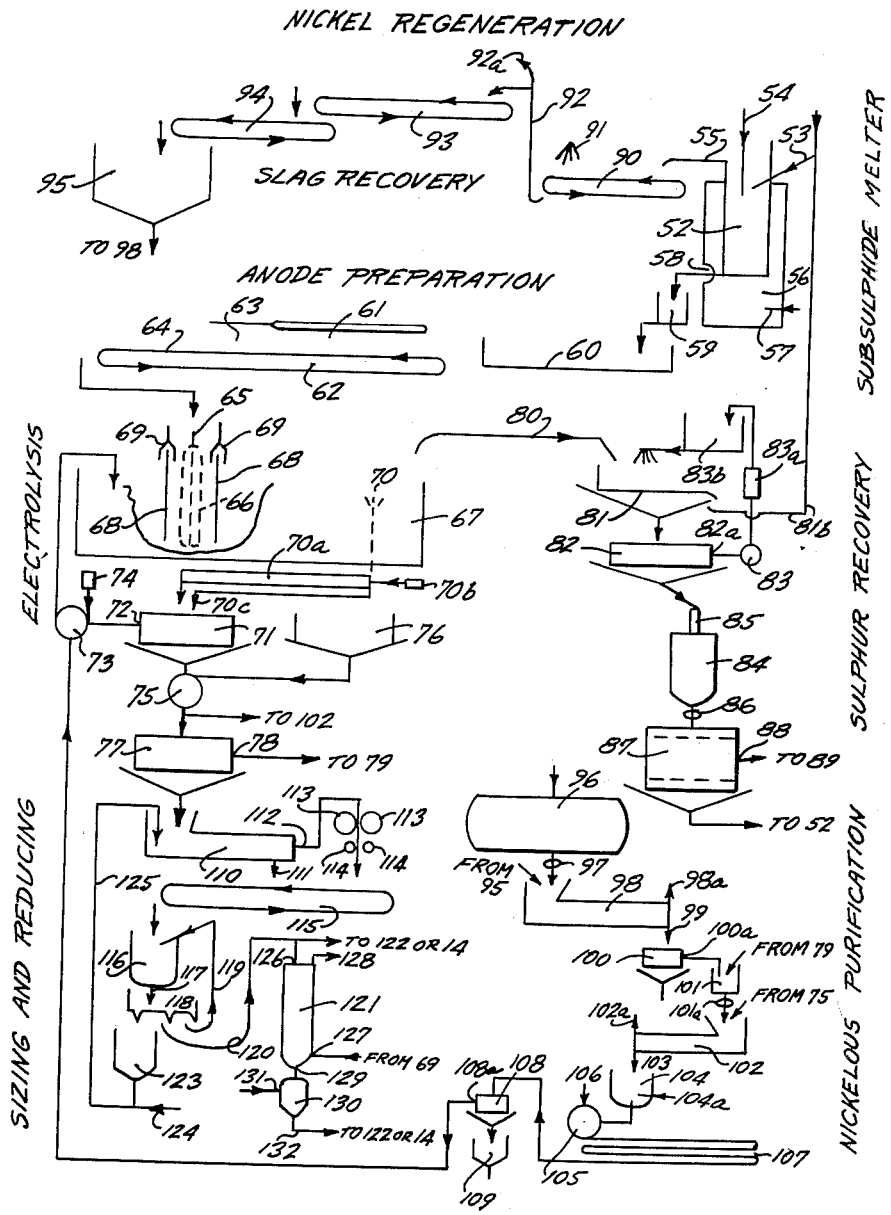
FIG. 2 is a schematic showing of regenerating steps in accordance with my invention.

The sulphided nickel granules after either the first or second step hydrofining are regenerated as diagrammed in FIG. 2. The preparation of nickel sulphide anodes is diagrammed near the top level. Beneath and to the left is diagrammed the electrolysis and other preparation of catalytic surfaces.

Sulphided or spent nickel is fed into melter 52 at a top inlet 54. Minor amounts of anode scrap or impure sulphur may be fed through inlet 53. Floating foamy slag blankets the melt from air oxidation, also impeding volatile sulphur loss. Any slag excess may be skimmed off at overflow gate 55. The melter is substantially inclosed in a furnace 56, heated by flames from burners 57. Molten nickel subsulphide is tapped off at the bottom of the melter through plug exit 58 into mobile ladle 59. Molten nickel subsulphide at a temperature near 1800° F. is cast in convenient sizes or slabs in anode molds 60. After solidifying the hot anodes are annealed in the insulated self-heated oven 61. The temperatures at the entrance are near 1000° F., at the oven exit near 800° F. This oven can operate continuously by moving the anode slowly therethrough upon a metal belt 62, thence into a covered by uninsulated and cooler section 63, thence through an uncovered section 64 for chilling the annealed anodes.

Each anode 65 leaving 64 may be further cooled or stored before bagging. Each anode is inserted in a diaphragm bag 66, e.g. of cotton fabric. And the electrolytic tank 67 is lined with water proofing pitch or synthetic resin. Tank 67 is represented with one side broken to expose three of many electrodes. The bagged anodes 65 are loaded into tank 67 between cathodes 68. These cathodes preferably consist of thin nickel sheet. Gaseous hydrogen may be collected above each nickel cathode by means of a manifolded plastic or similar hood 69, partly immersed in the electrolyte. The anodes are connected together with positive bus bars.

The anolyte comprises an aqueous solution of sodium chloride. During electrolysis, the nickel subsulphide decomposes to elemental sulphur and to nickel chloride. Catholyte sodium hydroxide precipitates a nickel hydroxide from the anolytic nickel chloride. The nickelous slurry overflows through pipe 70 onto continuous filter 71. The slurry may flow either directly through pipe 70c to filter 71 or via continuous oxidizer 70a. In 70a, the slurry mixes with sodium hypochlorite solution proportioned from pump 70b. The mixture is partially oxidized in 70a and any residual soluble nickel is precipitated. Through outlet 72 and pump 73 the sodium chloride filtrate is returned to tank 67. Aqueous alkali, preferably sodium hydroxide, may be proportioned by pump 74, and mixed into the return saline stream, e.g. in pump 73. Pump 74 is controlled by a set pH from a continuous pH meter (not shown) and whose electrodes are immersed in the electrolyte. The saline nickelous-nickelic precipitate from filter 71 is repulped in mixer 75 with wash water from tank 76. The slurry flows onto conitnuous filter 77. The very dilute sodium chloride filtrate passes through exit 78 either to waste or to tank 79, not shown.

As sulphur disintegrates from the anode, the volume of powder and granules gradually increases within the bag 66. These bags should be repaired or renewed frequently to prevent elemental sulphur from contaminating the nickel hydroxide. The sulphur in bag 66 is contaminated with nickel subsulphide, also with carbon when catalyzing pyrolytic hydrofining.

The current density applied is, for example, between 4 and 13 amperes per square foot. The voltage per cell, for example, may begin somewhat less than three and then increase somewhat beyond three as elemental sulphur accumulates within the diaphragm bag. When most of the nickel subsulphide is decomposed, the current is disconnected, the bags are hoisted onto platform 80. Much of the nickel solution drains back into tank 67. The bag contents, also anode scrap, are dumped onto the center of shaking screen 81 sprayed with water from tank 83b. The coarse material passes off the screen at the first discharge spout, conveyor 81b returning it to melter 52 through inlet 53. The slurry of sulphur fines through screen 81 pass to filter 82. The fines may be washed with water, e.g. a spray, before discharge from filter 82. The filtrate and wash water pass through filter outlet 82a, via pump 83 through small cation exchanger 83a to remove nickel, thence to tank 83b for example. The washed fines pass into the sulphur melter 84 at lock inlet 85. Under pressure the impure sulphur is heated to a temperature near 280° F. The melt discharges via rotary outlet valve 86 to hot pressure filter 87. The molten and filtered sulphur passes out of filter 87 at outlet 88 to sulphur storage 89. Nickel subsulphide fines contaminated with sulphur from filter 87 can be recycled into melter 52. Part of any contaminating carbon may be removed via oxidation, e.g. with the floating slag. Or the sulphide fines may be oxidized at relatively low temperature to remove carbon, as follows in the next three sentences. The nickel sulphate formed can be leached out. Any nickelous residue can be oxidized in an aqueous ammonia solution of ammonium carbonate. After separating elemental carbon aqueous sodium carbonate may be added to the nickel solutions to precipitate basic nickel carbonate.

Slag from overflow 55 is flowed and spread onto moving and flexible metal belt 90. The slag is air cooled until solid, then quenched with a water spray 91 to crack the slag. Scraping the slag from the end of belt 90 breaks the slag as it topples into conveyor 92. The slag is further broken in conveyor 92 while moving crushed slag either to storage bin 92a (not shown) or to continuous roasting grate 93. The hot sulphur dioxide from the roasting may be reacted with any hydrogen sulphide to give water and elemental sulphur. For example, the gas mixture may be contacted with hot catalyst, or bubbled through the melt in melter 52. Nickel oxide falls as an ash from the end of grate 93 onto continuous cooling grate 94 into storage bin 95, thence into continuous reactor 98. Therein nickel oxide is mixed and reacted with aqueous concentrated hydrochloric acid from tank 96 through valve 97 controlled to feed an acid excess. Moving helically and horizontally through 98, the slurry becomes heated, and its nickel content dissolved. Part of reactor 98 is jacketed for steam or hot water. Reactor 98 comprises a gas vent 98a. The hot slurry through outlet 99 is then processed to purify. The slurry flows onto continuous filter 100, becoming cooled thereon. The filtrate, consisting of impure aqueous acid nickelous chloride, flows through outlet 100a into feed tank 101. Therein the filtrate may be diluted, e.g. with wash water from 79. The acid nickelous chloride solution flows through outlet control valve 101a into continuous reactor 102. Partially jacketed reactor 102 comprises a vent 102a. In reactor 102, the acid nickel chloride is neutralized in part, e.g. with a repulped slurry of nickel hydroxide from mixer 75. Moving helically and horizontally through reactor 102, the nickel hydroxide dissolved in the warm or hot acid nickel chloride, emerging from outlet 103 with a pH near 4. This slightly acid nickel chloried solution flows into feed tank 104. Therein air may be bubbled into the solution through pipe and distributor 104a.

To more completely precipitate iron, lead, arsenic, the solution from tank 104 may be further oxidized. For example, oxidation with air or oxygen may be carried out under pressure and agitation. Or an oxidizing soluiton from 106 may be proportioned into the solution from tank 104 within mixer pump 105. A minor proportion of an oxidizing solution such as sodium hypochlorite can oxidize cobaltous rather than nickelous ion. And at a pH near 4.3, the cobaltic chloride is hydrolyzed and precipitated as cobaltic hydroxide. A recording pH controller, not shown, may adjust pH with electrodes located in mixer 105 or coil 107. This control may be supplemented with electrodes in other locations, e.g. in 101 or 103 or 104.

The hot oxidized solution is pumped via pump 105 through a long coil 107, to coarsen the precipitate comprising iron, lead, arsenic. This precipitate is filtered on coated filter 108, preferably coated with solid adsorbent or filter aid. Through outlet 108a, this purified filtrate is returned to electrolytic tank 67. The precipitate from filter 108 may be collected in tank 109. Subsequently any cobalt or nickel may be recovered therefrom, e.g. by means comprising dissolving and reducing the precipitate.

The washed nickel hydroxide from filter 77 enters pugger 110. Any water squeezed out leaves pugger 110 at trap 111. Nickel hydroxide dough leaving pugger 110 under pressure at outlet 112 is squeezed between two sheeting rolls 113. The sheet passes through two cutter rolls 114, e.g. to cut many parallel grooves into the sheet. This sheet passes onto a slow moving endless belt 115, e.g. of metal screen. A stream of hot air blows concurrently against the moving sheet to dry it. The dried or partially dehydrated sheet falls from the belt into the continuous breaker 116. The broken or granular corroded nickel leaves the breaker at exit 117, and falls onto the center of continuous vibrating screen 118. The coarsest particles discharge first through a side spout and recycle via conveyor 119 into breaker 116. Coarser particles discharge next through another side spout into conveyor 120, and are conveyed either to continuous hydrogen reducer 121 or to the first treating reactor, e.g. to sweetener 122, not shown, or to 14. The finer particles discharged last from screen 118 are collected in bin 123. These fines are pneumatically conveyed by air 124 through pipe 125 back into pugger 110.

Coarser particles to be reduced pass into reducer 121 at top inlet 126. Particles moving down slowly are reduced by an upward flowing stream of hydrogen, preferably of high purity, entering at bottom inlet 127. This hydrogen may be obtained from the electrolysis via cathode hoods 69 after purification and storage. Reducer 121 is heated to 800–900° F. in the upper section. In the lower section hot reduced nickel is cooled by hydrogen. Wet hot hydrogen leaves the reducer at top exit 128. Cool reduced nickel leaves the reducer at bottom exit 129, and drops into tank 130. Liquid hydrocarbon, e.g. hydrofined distillate, feeds into tank 130 at inlet 131 to protect the reduced nickel from oxygen. From tank 130, the reduced nickel slurry moves by conveyor 132 to the first treating reactor, e.g. to sweetener 122 or to 14.

Other modifications will be apparent from the above description to those skilled in the art. And some simpler or more economic operating conditions are exemplified in the specification as follows.

My nickel anodically regenerated in chloride ion anolyte may be used as adsorbent or catalyst for other than the desulphurizing or hydrofining of petroleum type fluids. Between regenerations, my catalytic nickel may be used as adsorbent or reagent or catalyst. In this sequence, the nickel may adsorb impurities, or react with sulphur while hydrogenating olefines, or hydrogenolyze distillate molecules. For example, the sequence may begin by sweetening sour distillate by contact with fresh catalytic nickel at a superatmospheric temperature cooler than 200 or 300° F. The contact temperature depends in part upon boiling range. And unreduced nickel requires hotter contact temperatures than reduced nickel. For example, a sour naphtha may contact reduced nickel near room temperature, or with unreduced nickel at 170° F. Or a sour white heating oil may contact reduced nickel at 170° F., or with unreduced nickel at 240° F. Liquid sour distillates are sweetened preferably without vaporization, e.g. by percolating through granular catalytic nickel. Sour distillate may be percolated through a series of nickel beds. For example, I may use a series of three beds, two in percolation while one is discharged and recharged with fresh catalytic nickel. Then the sour distillate preferably is percolated through the more used, then through the fresher nickel.

Unreduced nickel, used or unused for sweetening, can be reacted with sulphur bearing distillate vapor and hydrogen to yield hydrofined distillate plus sulphided nickel plus water. Occasionally this steam of reduction may interfere with subsequent processing. Then nickel in the reduced state is preferred for the sulphur sensitive hydrofining. In FIG. 1 is diagrammed a hydrofining followed without condensation by reforming. Unreduced nickel may be fed for this hydrofining, e.g. with low sulphur naphtha. Or reduced nickel may be fed for this hydrofining, e.g. with high sulphur naphtha. Any reduction in relatively pure hydrogen to elemental nickel should precede any desulphurizing of distillate. Such prereduction in hydrogen may be promoted by incorporating a small proportion of inorganic compound, e.g. of copper or a smaller proportion of silver, in the nickel hydroxide.

Granular nickel, before or after percolation to sweeten, may be fed through 14, 15, 16 into the top of sulphur sensitive hydrofining reactor 6. The temperature near the top may vary between 200 and 300° F. Or the range may be wider depending upon several factors. For example, use a hotter temperature with medium rather than light distillate, or with unreduced rather than reduced nickel. The catalytic nickel may flow by gravity slowly down the hydrofining reactor 6. I prefer to limit or control the sulphiding in the catalytic nickel leaving the reactor and stripper at exit 12 to nickel subsulphide or to relatively less sulphided nickel, e.g. nickel hemisulphide, $Ni_2S$.

Vapor velocities preferably increase up the reactor. The catalytic nickel in the upper part of the reactor may become mobile by dense phase fluidizing. The hotter granular nickel in the lower part of the reactor may remain relatively quiet and uncrushed by the column above. Transfer of sulphur from distillate to nickel may be the predominant reaction in this lower column. Catalytic hydrogenation may be the predominant reaction in the upper column, particularly with cracked distillate. The raw distillate vapor may enter the sulphur sensitive hydrofining reactor near its bottom and hot, e.g. at a temperature near 470–520° F. with naphtha, or near 530–580° F. with a middle distillate. Space velocities may vary from near 0.1 to more than one barrel of hydrofined distillate per barrel of sulphur sensitive nickel. Lighter or lower sulphur distillates are hydrofined at the higher space velocities.

Temperature control supplemented by gaseous hydrogen excess is required to minimize degradation during sulphur uptake. This sulphur sensitve temperature control comprises increasing the temperature with sulphiding. For example, the following approximation represents a guiding relation $$2M_s^{\frac{1}{2}} \sim T/T_b$$

where $M_s$ represents the mol ratio of sulphur to nickel, $T$ represents the corresponding desulphurizng Fahrenheit temperature between about 100 and 600° F., in particular at any horizontal section up reactor 6, $T_b$ represents the temperature bounding two divisions of sulphur sensitve hydrofining.

The relation of this boundary temperature to catalyst activity is described in U.S. Patent 2,174,510, and diagrammed in FIG. 1 thereof, a guide for controlling or improving gradient changes. Near $T_b$ or 400° F., the hydrogen required to inhibit degradation is near maximum. Thus in the sulphur sensitive hydrofining reactor 6, progressive volumes of hydrogen are introduced at inlets 10, 7, 28, 27, 26, 25, 24, 23, mostly to inhibit degradation according to the equation above. Further hydrogen may be added at inlets 22, 21, 20, 19, 18 more for cooling and other purposes, including any subsequent reforming.

The gaseous hydrogen control may be guided by two factors; first, the partially sulphided nickel tends to require more hydrogen at 400° F. than at hotter temperatures; second, high sulphur (and higher boiling) distillates require more hydrogen than low sulphur (and low boiling) distillates.

Sulphur sensitive temperatures cooler than 400° F. may need extra hydrogen for vaporizing or for cooling more than for inhibiting catalyst degradation. For such a combined need, hydrogen may be proportioned about inverse to the temperature below 600° F. For example, the hydrogen to cool a low sulphur light distillate may be approximated as $$100M_h \sim 600 - T$$

Or the hydrogen to cool a higher sulphur medium distillate may be approximated as $$40M_h \sim 600 - T$$

Here $M_h$ represents the mol. ratio of gaseous hydrogen to hydrocarbon and similar compounds.

The following is a sample reaction when hydrofining with sulphur sensitive and unreduced nickel:

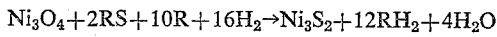
$$Ni_3O_4 + 2RS + 10R + 16H_2 \rightarrow Ni_3S_2 + 12RH_2 + 4H_2O$$

Here R represents an olefine or an olefinic radical. The following is a sample reaction when hydrofining with sulphur sensitve and reduced nickel at lower temperatures or pressures:

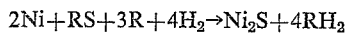
$$2Ni + RS + 3R + 4H_2 \rightarrow Ni_2S + 4RH_2$$

Partially sulphided nickel, such as $Ni_2S$, may be used further to catalyze hydrofining in which most of the sulphur from the distillate appears as hydrogen sulphide. This hydrofining is catalyzed by sulphur saturated activated by sulphur sensitive nickel. During such hydrofining the catalyst may sulphide further, e.g. to about $Ni_3S_2$. With this sulphur saturated nickel, sulphur removed from petroleum or distillate thereof appears as hydrogen sulphide. The preferred temperatures range from 700 to 1000° F., preferred pressures from 250 to 3000 p.s.i.g. Nickel subsulphide may be used to catalyze severe hydrofining or hydrocracking, preferably at the higher of these temperatures and pressures. The preferred recycle of hydrogen is between 500 and 10,000 standard cubic feet per barrel distillate hydrofined. The preferred space velocity is between 0.3 and 10 barrels of hydrofined petroleum or distillate thereof per barrel sulphided nickel catalyst.

Hydrofining or hydrocracking with sulphur saturated nickel comprises hydrogenolyzing both a minor proportion of hydrocarbons and a larger or major proportion of other compounds. Such hydrogenolyses may be carried out either in batch or continuous reactors. The batch reactor may be carbon steel lined either with stainless or stainless and ganister. This reactor is preferably charged with catalytic nickel through its top, discharged through its bottom. This reactor is preferably short and charged with a shallow bed of sulphided nickel. The distillate vapor and hydrogen preferably passes downflow through the sulphided nickel. Several of these batch reactors may operate in parallel, one being a swing reactor. Somewhat lower boiling distillates may be hydrofined or hydrocracked continuously with a sulphur saturated nickel in an alloy or alloy lined reactor, e.g. as follows: Sulphided nickel is fed continuously or intermittently into the reactor top, discharged from the bottom, e.g. through locks. Distillate vapor and hydrogen heated e.g. to between 870 and 970° F., is fed in at the reactor bottom. The vapor is preferably cooled, e.g. by 20 to 70° F., as it passes upflow through the sulphided nickel. Hydrogen as coolant may be introduced in side streams.

Sulphided nickel may be treated or promoted prior to sulphur immune catalysis. For example, basketed nickel subsulphide may be soaked in an aqueous potassium or sodium hydroxide or similar alkaline solution. Then the basket is lifted above the solution to drain. After drying, the sulphided and promoted nickel may catalyze hydrocracking or severe hydrofining. The alkali promotion may increase the ratio of hydrocarbons to elemental carbon. After the promoted nickel becomes spent, its alkali compound may be recovered by leaching in hot water. And after drying, the spent sulphided nickel is melted, cast, or electrolytically regenerated.

Fully sulphided nickel may be charged to the melter 52. Other additions may be made to adjust the matte to constant composition near $Ni_3S_2$. Such additions may include sulphided nickel of different composition or impure sulphur or anode scrap from 81.

The sulphur content of my matte lies between that of nichel hemisulphide and nickel sulphide, i.e. between $Ni_2S$ and NiS. The sludge from a nickel hemisulphide anode may comprise one part hard nickel sulphide per two parts granular sulphur. The proportions, $Ni_7S_{5\pm 1}$, electrolyze substantially to free sulphur, contaminated with very little nickel sulphide. But the proportion $Ni_7S_5$ (28% sulphur by weight) yields a stronger anode, but a less pure sulphur. I prefer an anode with a ratio of sulphur to metal between 0.3 and 0.4 by weight. A minor proportion of the nickel may be replaced with another metal, e.g. cobalt or copper. Either cobalt or copper may promote the nickel. In addition, cobalt may be added to co-precipitate iron, lead, arsenic, while purifying nickel chloride.

I prefer to treat the slag differently from the molten matte beneath. Part of the slag is withdrawn at 55, part is remixed with the melt beneath, part remains afloat to blanket the melt against air. These three parts of slag may be proportioned according to specific needs. By modifying the design and operation of furnace 52, the ratio of overflow to remixed slag may be changed. For example, a high ratio may be maintained where extreme separation of iron, lead, arsenic is desired, or where recovered sodium chloride in excess can be utilized readily or economically. The regeneration as diagrammed in FIG. 2 for several refineries can be combined in one location. Then in addition to labor and similar economies, by-products may be disposed of or utilized more effectively. For example, by-product sodium chloride may be electrolyzed to produce sodium hydroxide or sodium hypochlorite or hydrochloric acid.

The slag withdrawn at 55 may be solidified as shown and then roasted or roasted directly. The very small proportion of make-up catalytic metal may be nickel ore or concentrate. For example, a nickel matte may be roasted with slag on a continuous grate 94, be collected in hopper 95, and be purified before reaching electrolytic tank 67.

The molten nickel subsulphide is cast in rectangular shape convenient for large anodes. The melt is cast around metal reinforcing and conductor straps in the upper end. The straps preferably are nickel or a corrosion resisting alloy. Anodes crack when chilled abruptly, e.g. entirely in open atmosphere. But I interrupt such chilling with partial insulation so that 2.5 to 3 more hours elapse in cooling from 900° F. to 800° F. This annealing prevents most cracks or fractures in the anode.

The preferred electrolyte comprises warm, aqueous sodium chloride, stronger than ocean salinity, but not a concentrated brine. I prefer 0.6 to 1.2 molar sodium chloride. Sodium bromide or potassium chloride is tolerable as an impurity rather than as a substitute for sodium chloride. The electrolyte is heated somewhat by electrical energy in excess of the electrochemical requirement, e.g. as noted in the excess voltage. Nickel chloride formed in the anolyte is precipitated by sodium hydroxide from the catholyte. The resulting nickelous hydroxide slurry flows continuously through pipe 70 from tank 67. The nickelous precipitate may be partially oxidized, preferably with sodium hypochlorite solution before separating. Or the partial oxidation may be omitted. In either instance the nickel hydroxy precipitate is separated, e.g. on continuous filter 71. The nickel hydroxy precipitate preferably is washed with only a small proportion of water. This wash need not be distilled water. For example, tap or similar water, partly demineralized by an anion exchange resin may serve to wash the nickel hydroxy precipitate. The precipitate on filter 71 may be washed with a water spray while yet on the filter. Or the precipitate may be more thoroughly washed by repulping in mixer 75 and then refiltering on filter 77. These wash waters, comprising very dilute sodium chloride, may be discarded or utilized, e.g. to dilute concentrated hydrochloric acid from tank 96.

The clear electrolyte, e.g. from outlet 72, is treated and returned to tank 67. The treatment may comprise pH adjustment. Hydrogen ion concentration is expressed herein as pH at room temperature. At a pH of 7, only a minor part of the nickel chloride precipitates. At a pH of 8, the precipitation approaches completion. The pH of my electrolyte is preferably between about 7.4 and 8.4. When the nickelous hydroxide from overflow pipe 70 is to be partially oxidized with alkaline hypochlorite, I prefer a pH near 7.4 or 7.8. When nickelous hydroxide is unoxidized, I prefer a somewhat more alkaline pH, e.g. 7.8 to 8.4.

Described above is the anodic release of elemental sulphur from nickel in a near neutral or slightly alkaline chloride ion anolyte. I may also release sulphur from nickel in an acidic chloride ion anolyte. Diaphragm bags around the anode to contain released sulphur should be acid proof. Such an acidic electrolyte also may comprise sulphate ion. Nickel ion may discharge at the cathode. Electroplated nickel may be converted to catalytic surfaces. For example, this elemental nickel may be oxidized anodically to nickel hydroxy or hydrated compound in a sodium acetate electrolyte.

A part of the regenerating nickel may be purified continuously. The purification preferably comprises dissolving nickel compound in strong mineral acid, adjusting the pH, e.g. to near four, oxidizing and precipitating cation impurities. Hydrochloric is preferred to sulphuric as the purifying mineral acid. Nickel oxide from roasted slag may be dissolved in concentrated aqueous hydrochloric acid, e.g. 10 to 35% by weight hydrogen chloride. Heat is liberated as nickel chloride forms, e.g. in reactor 98. The hot and acidic nickel chloride is clarified, e.g. on filter 100. Most of the free hydrochloric acid in this nickel chloride filtrate may be neutralized with nickel hydroxy precipitate, e.g. from repulping pump 75. The acidity of the dissolved nickel chloride may be adjusted to a pH near 4. Oxidize the heated solution. Mild oxidation, e.g. with air, preicipitates iron, lead, and arsenic. Further oxidation, e.g. with chlorine or sodium hypochlorite solution, precipitates cobalt in addition. And severe oxidation, e.g. with extra chlorine, also oxidizes a minor part of the nickel, which hydrolyzes at a pH near 4 to a nickelic comprising precipitate. In this purifying, I prefer to control the oxidation so as to inhibit nickel oxidation and precipitation. Mild oxidation is preferred with separation conditions readily removing iron, lead, arsenic, rather than nickel. Mild oxidation is believed to convert ferrous ion largely to a $Fe_3O_4$ state, plumbous to a $Pb_3O_4$ state, arsenous to a $AsO_2$ state. Separation comprising precipitation may require heating and slow flow, e.g. to coagulate or coarsen the precipitate prior to filtering. Further oxidation is preferred where the removal of iron and lead and arsenic needs help from a more voluminous coprecipitation of cobaltic hydroxide. Or iron and lead and arsenic may be removed completely in two stages. For example, mildly oxidize, e.g. with air, the impure nickel chloride solution more acid than pH 4.1 or 4.2, and separate most or much of the iron and lead and arsenic. Then further oxidize the partially purified solution to convert cobaltous to cobaltic ion, and at a pH near 4.3 co-precipitate cobaltic hydroxide with residual ferric, arsenic, plumbic, and similar solid compounds. This co-precipitate may be redissolved and reduced, e.g. with $SO_2$. Then with mild oxidation, iron and lead and arsenic may be precipitated at a pH below about 4.3. The cobalt and nickel in solution may be further purified and added to the bulk of purified acidic nickel chloride. The acidic solution comprising nickel chloride may be neutralized continuously with sodium hydroxide, e.g. from pump 74. The neutralizing may be adjusted to maintain the pH for the entire electrolyte. The neutralized slurry may be returned to tank 67. Or acidic nickel chloride solution may be partially neutralized or purified by ion exchange. Thus, iron and lead and arsenic may be removed by contacting an impure nickel chloride solution with a cation exchange resin.

The nickel hydroxy precipitate is processed prior to recycling to a cooler desulphurizing of distillate. The precipitate may be sucked free of extraneous water. This cake or mud may then be pugged to extrude or to sheet and cut into strips. The cross section of these continuous linear strips is small for desulphurizing distillate with fluidized nickel. The cross section usually is larger, e.g. 0.001 to 0.02 square inch, for desulphurizing distillate in a stationary or downward moving packed column of nickel. For example, 40 or 30 to 4 or 2 mesh particles may be used, particularly the coarser particles with the longer packed column. The damp strips move onto a moving belt for baking. The baking may be discontinued at a drying state or further to roast. Roasting at a temperature near 750° F. or 800° F. soon blackens the catalytic particles. During blackening, part of the nickelous is oxidized to nickel peroxide or nickel oxide. Sodium hypochlorite can oxidize nickelous hydroxide to similar and hydrated compounds. Such high oxy states contribute to active sites and improve catalysis. Thus, I may use a nickelous-nickelic oxy or black nickel compound, whether prepared by hypochlorite oxidation or by roasting in air. Baking or roasting hardens the particles. The harder particles break more readily under impact, particularly when the strips have been notched while yet damp. The broken particles may be screen sized prior to reduction in hydrogen or recycling to a cooler desulphurizing of distillate.

The tabulations below list four types of desulphurizing. The first two types are sulphur sensitive. The last two types are sulphur saturated, removing sulphur from petroleum or distillates mostly as hydrogen sulphide. The catalytic nickel for each of the four successive types is more sulphided, the reaction upon the hydrocarbons more hydrogenolytic or destructive. Successive desulphurizing temperatures are hotter, successive pressures typically higher. The four desulphurizing temperatures span most of the range between 100 and 1000° F.

TYPES OF DESULPHURIZING WITH CATALYTIC NICKEL

| Type of Desulphurizing | Type of Catalytic Nickel | Typical Reaction Upon Hydrocarbons |
|---|---|---|
| 1. (Sulphur sensitive) sweetening. | NiO | None. |
| 2. Sulphur sensitive hydrofining. | $Ni_2O$ / $Ni_2S$ | Olefine hydrogenation. |
| 3. Sat. activated by sens. hydrofining. | $Ni_2S$ | Olefine hydrogenation. Mild hydrogenolysis. |
| 4. Sulphur saturated hydrofining. | $Ni_3S_2$ | Hydrogenolysis. |

CORRESPONDING EXTERNAL CONDITIONS
[Desulphurizing Temperatures, ° F.]

|   | Range for Medium Distillate | Range for Lighter Distillate | Proportion of temp. Range more Effective for Single Operation | Typical liquid hourly space Velocities | Typical pressure range, p.s.i.g. |
|---|---|---|---|---|---|
| 1 | 200–350 | 100–200 | small | 1–10 | 1–100 |
| 2 | 300–650 | 200–550 | large | 0.1–2 | 1–250 |
| 3 | 650–800 | 600–750 | medium | 0.2–4 | 25–400 |
| 4 | 750–1,000 | 700–930 | small | 0.3–10 | 250–3,000 |

The temperatures in the first or sweetening range may be decreased somewhat, e.g. by 50° F., by using black reduced nickel rather than nickel oxide. At the cooler temperatures, nickel somewhat selectively adsorbs the sour sulphur compounds from the distillate.

A single sulphur sensitive hydrofining preferably uses a large proportion of its temperature range. With this large gradient, both low temperatures and space velocities are used. Space velocities are lowered to accommodate a longer thermal gradient. The gradient reactor should be larger than the isothermal reactor. But the gradient reactor operates at a markedly lower average temperature and pressure. These sulphur sensitive space velocities are manifold faster than might be expected of the very low reactor temperatures. Cleaner desulphurizing and hydrogenation results. This second type hydrofining is extraordinarily non-destructive. It may be used as a method for preparing a nickel catalyst substantially insensitive to sulphur poisoning.

During the third type desulphurizing, part of any higher molecular weight paraffins may yield two moles lower molecular weight paraffins or isoparaffins. During fourth or sulphur saturated hydrofining both olefine hydrogenation and hydrocracking may occur. At the higher temperatures and pressures polyaromatics may be partially converted to benzene, toluene, xylenes, etc. Alkali added to the catalytic nickel, e.g. to nickel hemisulphide, may decrease carbon accumulations upon the catalyst.

The first and second and third types of desulphurizing are limited in practice essentially to distillates, particularly medium or lighter petroleum and similar distillates. But whole crude or similar petroleum or heavy distillate also may be hydrofined with sulfur saturated nickel, particularly in mixed phase and with severity. This severity includes the higher temperatures and pressures and hydrogen recycle.

A relatively large hydrogen excess may be recirculated during a second or third or fourth type desulphurizing in the vapor phase, e.g. 1,000 to 10,000 cu. ft. or more per barrel hydrocarbon throughput as liquid. But in mixed liquid and vapor phase desulphurizing, lesser proportions of hydrogen may be used. Also lesser hydrogen, e.g. 300 to 4,000 cu. ft. per barrel distillate, may be recirculated for the third type desulphurizing of distillate vapor.

Example

Fresh catalytic nickel is prepared as shown in FIG. 2. The nickel hydroxide is sized to about 8 mesh, and roasted in air between 700 and 800° F. until black. The black nickel oxide is fed into hopper 14, thence through 15 and into the continuous hydrofining tower 6. About 9 to 10 pounds of nickel oxide is fed per barrel of motor fuel distillate described herein. This thermally cracked distillate is derived from a California crude petroleum. Its high sulphur content corrodes an engine during combustion therein, or partially poisons subsequent dehydrogenation with platinum reforming catalyst. Its relatively high nitrogen content interferes with cracking by silica-alumina and similar catalysis. The raw distillate quickly discolors, particularly in the presence of air. The olefine and nitrogen more than sulphur compounds in the raw distillate are implicated in this discoloration and instability.

The raw distillate is vaporized in coil 4. Heavy ends or polymers are separated in trap 4a. The vapors enter tower 6 at inlet 5 at a temperature near 550° F. and a pressure near 60 p.s.i.g. For each barrel of distillate fed, about 3,000 cu. ft. of hydrogen at standard conditions is added. The volume of hydrogen is distributed through inlets 7, 28, 27, 26, 25, 24, 23, 22, 21, 20, 19, 18, so as the desulphurizing temperature is graded least near the boundary temperature at about 400° F. Accordingly, 250 cu. ft. hydrogen is not added at each of the twelve inlets, but much less at and near inlet 23. For example, much more hydrogen is added at inlet 7 or 28 or 27 than at inlet 24 or 21. Nickel substantially spent for sulphur sensitive hydrofining is stripped of vapor in sub-chamber 9, and is then discharged through bottom outlet 12. This partially sulphided nickel may be used as a catalyst substantially insensitive to sulphur poisoning. And it may be further sulphided with hotter and sulphur saturated hydrofining.

The hydrofined distillate mixed with hydrogen leaving reactor 6 at outlet 17 may be cooled and separated. Or more hydrogen can be added at 17a. This mixture may be heated in furnace 2, then compressed, e.g. to 400 pounds, in compressor 32. The mixture enters the first stage reformer 33 at inlet 34. The dehydrogenation over platinum catalyst cools the reacting mixture, e.g. 80° F., as shown. The vapors are reheated in furnace 2, thence pass downflow through second stage reactor 37. The vapors are reheated and pass through third stage reactor 40. Much of the hydrocarbons leaving outlet 42 are aromatic. The mixture is cooled in exchangers 43 and 44, passing into separator 46. About 3 pounds of water per barrel distillate leaves via the bottom outlet 47. Most of such water can be eliminated prior to reforming by reducing the nickel component to black metallic nickel in hydrogen prior to hydrofining.

Inspection of thermally cracked California distillate before hydrofining:

| | |
|---|---|
| Sulphur | 0.73%. |
| Nitrogen | 0.01%. |
| Copper dish gum | 630. |
| Color | Dark orange. |
| Doctor test | Very positive (sour). |
| Gravity, ° API | 51. |

ASTM distillation, °F.:
    IBP ———————————— 139.
    50% off ———————— 290.
    90% off ———————— 410.
    Endpoint ———————— 453.

The sulphur sensitive hydrofining was carried out at a variety of space velocities to produce variously hydrofined products. The product was water white and sweet at higher space velocities, but discolored upon standing. The product was reasonably stable to air when sulphur 0.2 to 0.3% sulphur remained after hydrofining. At 0.1% sulphur the product was stable, the copper dish gum was 53, with substantially no reduction in unleaded octane rating. Sulphur and potential gum were removed faster than nitrogen or olefine compounds. With a slower space velocity and relatively more hydrogen, a sulphur content below 0.01% was obtained. Such a low olefine product may be reformed substantially without degrading the platinum with sulphur and similar poisons, e.g. as diagrammed in FIG. 1. This and other catalytic nickel may be used to hydrofine distillate prior to reforming with platinum catalyst, removing sulphur from the sulphided nickel at an anode in a chloride ion anolyte.

I claim:

1. The method for removing sulphur from sulphided nickel catalyst obtained in the hydrofining of hydrocarbon fluids which comprises melting and casting a mixture of such sulphided nickel in which the proportion of sulphur to nickel is higher than that in nickel hemisulphide, but not greatly in excess of that in nickel subsulphide, then annealing and cooling the casting, connecting the casting as anode in a nickel aqueous anolyte while passing direct current to corrode the anode, releasing elemental sulphur and dissolving nickel while retaining said nickel substantially as an oxidized compound, and processing the resulting oxidized compound of nickel as fresh catalytic material for reuse in the hydrofining of hydrocarbon fluids.

2. The method as defined in claim 1 wherein said mixture of sulphided nickel provides a proportion of sulphur to nickel between 0.3 and 0.4 by weight.

3. The method for removing sulphur from sulphided nickel catalyst obtained in the hydrofining of hydrocarbon fluids which comprises melting and casting a mixture of such sulphided nickel in which the proportion of sulphur to nickel is higher than that in nickel hemisulphide, but not greatly in excess of that in nickel subsulphide, then annealing and cooling the casting, connecting the casting as anode in an aqueous solution of a nickel dissolving anolyte comprising chloride ion while passing direct current both to warm the electrolyte and to corrode the anode, releasing elemental sulphur and dissolving nickel while retaining the nickel substantially as an oxidized compound, and processing the resulting oxidized compound of nickel as fresh catalytic material for reuse in the hydrofining of hydrocarbon fluids.

4. The method for removing sulphur from sulphided nickel catalyst obtained in the hydrofining of hydrocarbon fluids, which comprises melting a mixture of such sulphided nickel in which the proportion of sulphur to nickel is between about 0.3 and 0.4 by weight to obtain a melt and a slag containing impurities, casting the melt in flat sheets, connecting the cast sheets as anodes in an aqueous solution of a nickel dissolving anolyte comprising chloride ion while passing direct current both to warm the solution and corrode the anode, releasing elemental sulphur and dissolving nickel while retaining the nickel as an oxidized compound, and processing the resulting oxidized compound of nickel as fresh catalyst for reuse in the hydrofining of hydrocarbon fluids.

5. The method as defined in claim 4, wherein the slag separated from said melt and containing both nickel and metallic impurities is processed to recover a nickel compound essentially free of said metallic impurities.

6. The method for removing sulphur from sulphided nickel catalyst obtained in the hydrofining of hydrocarbon fluid which comprises melting and casting a mixture of such sulphided nickel in which the proportion of sulphur to nickel is between about 0.3 and 0.4 by weight, then annealing and cooling the casting, connecting the casting as anode in a slightly alkaline aqueous solution of an electrolyte comprising sodium chloride while passing direct current to corrode the anode, releasing elemental sulphur and dissolving nickel while retaining said nickel substantially as nickelous hydroxy compound, and processing the resulting nickelous hydroxy compound as fresh catalytic material for reuse in the hydrofining of hydrocarbon fluids.

7. The method as defined in claim 6, wherein wet nickelous hydroxy compound is pugged, formed, sized and mildly heated in a manner to obtain particles providing fresh readily reducible catalytic surfaces.

8. The method for removing sulphur from sulphided nickel catalyst obtained in the hydrofining of hydrocarbon fluids which comprises melting and casting a mixture of such sulphided nickel in which the proportion of sulphur to nickel is betwen about 0.3 and 0.4 by weight, then annealing and cooling the casting, placing the casting in a diaphragm walled compartment, connecting the casting as anode in a slightly alkaline aqueous solution of sodium chloride while passing direct current to corrode the anode, releasing elemental sulphur which is retained in said diaphragm while dissolving nickel which passes through said diaphragm as nickel chloride and reacts exterially of said diaphragm with electrolyte to precipitate substantially nickelous hydroxide, and processing the resulting nickelous hydroxide precipitate as fresh catalytic material for reuse in the hydrofining of hydrocarbon fluids.

9. The method as defined in claim 8, wherein the electrolyte concentration is 0.6 to 1.2 normal and has a pH less than about 9.

10. In the hydrofining of petroleum type fluids using catalytic nickel surfaces, the improvements that comprise conducting such hydrofining counter-currently under conditions to provide as spent catalyst sulphided nickel in which the proportion of sulphur to nickel is between about 0.3 and 0.4 by weight, and regenerating such spent catalyst by heating the same to form a melt and a floating slag containing impurities, casting the melt as a flat sheet, cooling the sheet both to solidify and anneal the same, connecting said sheet as anode in an aqueous solution of a nickel dissolving anolyte comprising chloride ion, passing direct current both to warm the solution and corrode the anode thereby releasing elemental sulphur and dissolving nickel which is retained as an oxidized compound, and processing the resulting oxidized compound as fresh catalytic material for reuse in the hydrofining of petroleum type fluids.

11. The method as defined in claim 10, wherein the anolyte is a slightly alkaline solution of sodium chloride, and the oxidized compound of nickel is substantially nickelous hydroxide which precipitates from the electrolyte References Cited in the file of this patent

UNITED STATES PATENTS

| | | |
|---|---|---|
| 2,174,510 | Gwynn | Oct. 3, 1939 |
| 2,315,518 | Gwynn | Apr. 6, 1943 |
| 2,480,771 | Renzoni | Aug. 30, 1949 |
| 2,587,149 | Gwynn | Feb. 26, 1952 |
| 2,760,905 | MacLaren | Aug. 28, 1956 |
| 2,792,333 | Porter et al. | May 14, 1957 |
| 2,839,461 | Renzoni | June 17, 1958 |
| 2,885,352 | Ciapetto et al. | May 5, 1959 |
| 2,921,022 | Sowerwine | Jan. 12, 1960 |